United States Patent [19]

Omi et al.

[11] Patent Number: 5,122,178

[45] Date of Patent: Jun. 16, 1992

[54] PROCESS FOR PRODUCING GLASS DOPED WITH DISPERSED MICROCRYSTALLITES

[75] Inventors: Shigeaki Omi, Kawagoe; Yoshiyuki Asahara, Nishitama; Shuji Yoshida, Odahara, all of Japan

[73] Assignee: Hoya Corporation, Tokyo, Japan

[21] Appl. No.: 557,745

[22] Filed: Jul. 26, 1990

[30] Foreign Application Priority Data

Jul. 31, 1989 [JP] Japan ................................ 1-198590

[51] Int. Cl.⁵ .............................................. C03C 13/04
[52] U.S. Cl. ........................................ 65/33; 65/3.11; 385/141
[58] Field of Search ............... 65/3.11, 33, 3.12; 350/96.30, 96.34; 385/141

[56] References Cited

U.S. PATENT DOCUMENTS

| | | | |
|---|---|---|---|
| 3,922,155 | 11/1975 | Broemer | 65/33 |
| 3,926,603 | 12/1975 | Plesslinger et al. | 65/33 |
| 3,929,497 | 12/1975 | Monks | 65/33 X |
| 3,985,532 | 10/1976 | Grossman | 65/33 |
| 4,042,362 | 8/1977 | MacDowell | 65/33 |
| 4,974,933 | 12/1990 | Ainslie et al. | 65/3.11 X |
| 4,978,376 | 12/1990 | Takahashi et al. | 65/3.11 |

FOREIGN PATENT DOCUMENTS 0248564 12/1987 European Pat. Off. ........... 65/3.11

Primary Examiner—Robert L. Lindsay
Attorney, Agent, or Firm—Nixon & Vanderhye

[57] ABSTRACT

The present invention relates to a process for producing a glass doped with dispersed microcrystallites, which glass is used as a material for sharp cut filter, a material for infrared-transmitting filter, a nonlinear optical material, etc. In the process, high-melting semiconductor microcrystallites are precipitated at a temperature $T_1$ which is lower than the sag point of a glass to be produced but not lower than the transition temperature of the glass, and then low-melting semiconductor microcrystallites are precipitated at a temperature $T_2$ which is not higher than the flow point of the glass but not lower than the sag point of the glass to obtain a glass comprising a matrix and microcrystallites of semiconductor solid solution of multilayer structure dispersed in said matrix. This glass has solved, owing to the multilayer structure of the microcrystallites of semiconductor solid solution, the problem of conventional glasses doped with dispersed microcrystallites that the emission from the band edge of microcrystallites of semiconductor solid solution is hidden by the emission from the surface trap level.

15 Claims, 2 Drawing Sheets

PROCESS FOR PRODUCING GLASS DOPED WITH DISPERSED MICROCRYSTALLITES

BACKGROUND OF THE INVENTION

1. Field of the Invention

The present invention relates to a process for producing a glass doped with dispersed microcrystallites, which glass is used as a material for sharp cut filter, a material for infrared-transmitting filter, a nonlinear optical material, etc. More specifically, the present invention relates to a process for producing a glass doped with dispersed microcrystallites of semiconductor solid solution such as $CdS_x Se_{1-x}$, $CdS_x Se_{1-(x+y)} Te_y$ or the like.

2. Description of the Prior Art

A glass doped with dispersed microcrystallites, comprising a matrix and microcrystallites of semiconductor solid solution such as $CdS_x Se_{1-x}$ ($0<x<1$, the same applies hereinafter), $CdS_x Se_{1-(x+y)} Te_y$ ($0<x<1$, $0<y<1$, $0<x+y<1$, the same applies hereinafter) or the like dispersed in the matrix, is in use as a material for sharp cut filter having an absorption end at the wavelength range of visible light or an infrared range, or as a material for infrared-transmitting filter. In recent years, the glass doped with dispersed microcrystallites, comprising a matrix and microcrystallites of semiconductor solid solution of $CdS_x Se_{1-x}$ dispersed in the matrix has been found to show third-order nonlinear optical properties [J. Opt. Soc. Am. Vol. 73, No. 5, pp. 647-653 (1983)] and has drawn attention as a nonlinear optical material for optical switch, optical computer, etc.

For producing such a glass doped with dispersed microcrystallites, there has conventionally been adopted a process which comprises melting a mixture of a glass or its materials both to become a matrix and a material to become microcrystallites of semiconductor solid solution dispersed in the matrix, to obtain a glass melt; cooling the glass melt to room temperature to obtain a glass comprising a matrix and ions of the elements to constitute microcrystallites of semiconductor solid solution, dissolved in the matrix; heating the glass from room temperature to a given temperature; and maintaining the glass at that temperature to heat-treat the glass to precipitate microcrystallites of semiconductor solid solution in the matrix.

When a glass doped with dispersed microcrystallites is produced according to the conventional process, however, there appear crystal structure defects, dangling bond, etc. at the interfaces between the semiconductor microcrystallites and the glass matrix, and as a result there arises a trap level called "surface trap level" in the energy and structure of the glass doped with dispersed microcrystallites.

The surface trap level has a long life. In a glass wherein the surface trap level has arisen, the electron interband transition or the electron transition on the exciton in the vicinity of the band edge (both of the transitions are a source of third-order optical nonlinearr response) is hindered by the presence of the surface trap level, whereby the probabilities of the respective transitions are reduced and the intensity of the emission from the microcrystallites of semiconductor solid solution is weakened. Further in the glass doped with dispersed microcrystallites produced according to the conventional process, the peak wavelength of the emission from the surface trap level is in the vicinity of the peak wavelength of the emission from the microcrystallites of semiconductor solid solution.

Therefore, the fluorescence spectral intensity of the glass doped with dispersed microcrystallites produced according to the conventional process takes such a form that the emission (solid line 1) from the band edge of the microcrystallites of semiconductor solid solution is hidden by the emission (broken line 2) from the surface trap level, as schematically shown in FIG. 1(a); and such a glass has no excellent third-order nonlinear optical properties.

SUMMARY OF THE INVENTION

Hence, an object of the present invention is to provide a process for producing a glass doped with dispersed microcrystallites, having excellent third order nonlinear optical properties, by reducing the effect of the surface trap level on the emission from the band edge which is a source of the third-order optical nonlinear response and further by widening a distance between the peak wavelength of the emission from the band edge and the peak wavelength of the emission from the surface trap level.

According to the present invention there is provided a process for producing a glass doped with dispersed microcrystrallites, which comprises:

a first step of cooling a glass melt comprising a component to become a glass matrix and a component to become microcrystallites of semiconductor solid solution dispersed in the matrix, to a temperature $T_1$ which is lower than the sag point of the glass but not lower than the transition temperature of the glass, and then maintaining the resulting glass at the temperature $T_1$ to precipitate microcrystallites of semiconductor solid solution in the glass, and a second step of heating the glass wherein microcrystallites of semiconductor solid solution have been precipitated, to a temperature $T_2$ which is not higher than the flow point of the glass but not lower than the sag point of the glass, and then maintaining the resulting glass at the temperature $T_2$ (this invention is hereinafter referred to as "first embodiment").

According to the present invention, there is also provided a process for producing a glass doped with dispersed microcrystallites, which comprises:

a first step of heating a glass comprising a component to become microcrystallites of semiconductor solid solution, to a temperature $T_1$ which is lower than the sag point of the glass but not lower than the transition temperature of the glass, and then maintaining the resulting glass at the temperature $T_1$ to precipitate microcrystallites of semiconductor solid solution in the glass, and a second step of heating the glass wherein microcrystallites of semiconductor solid solution have been precipitated, to a temperature $T_2$ which is not higher than the flow point of the glass but not lower than the sag point of the glass, and then maintaining the resulting glass at the temperature $T_2$ (this invention is hereinafter referred to as "second embodiment").

DETAILED DESCRIPTION OF THE INVENTION

Figure 1A:
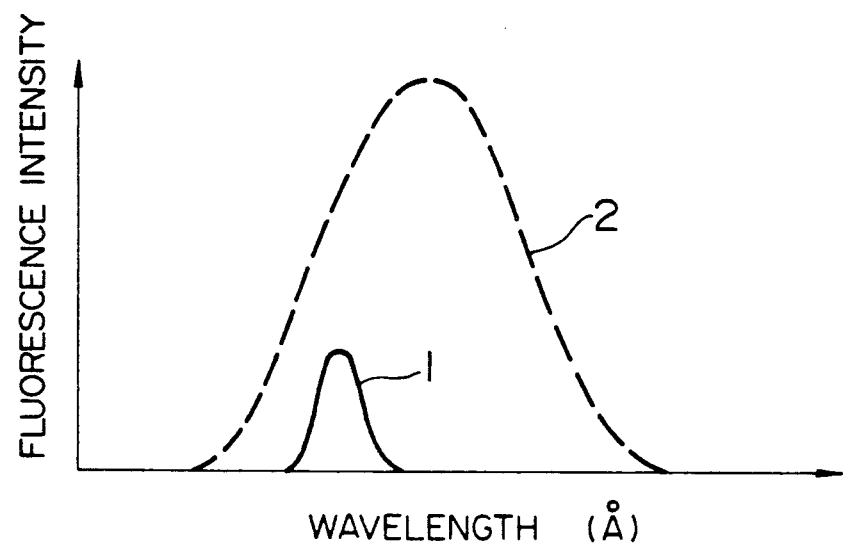
FIGS. 1(a) and 1(b) are graphs schematically showing the fluorescence spectral intensities of the glass doped with dispersed microcrystallites produced according to the conventional process and the glass doped with dispersed microcrystallites produced according to the present process.

To begin with, the first embodiment is described. As mentioned above, this embodiment includes the first step of cooling a glass melt comprising a component to become a glass matrix and a component to become microcrystallites of semiconductor solid solution dispersed in the matrix, to a temperature $T_1$ which is lower than the sag point of the glass but not lower than the transition temperature of the glass, and then maintaining the resulting glass at the temperature $T_1$ to precipitate microcrystallites of semiconductor solid solution in the glass.

The starting materials for the matrix component are preferably neutral or reducing compounds which do not substantially oxidize the component to become microcrystallites of semiconductor solid solution, such as oxides (e.g. $SiO_2$, $B_2O_3$, $ZnO$), carbonates (e.g. $Na_2CO_3$, $K_2CO_3$), acetates (e.g. $CH_3COONa$, $CH_3COOK$), hydroxides (e.g. $H_3BO_3$) and the like, and glasses obtained from these compounds, because the component to become microcrystallites of semiconductor solid solution, when oxidized, becomes soluble in the matrix component and is not precipitated as mocrocrystallites of semiconductor solid solution. The starting materials for the component to become microcrystallites of semiconductor solid solution are preferably metals, nonmetals and their compounds such as Cd, S, Se, Te, CdS, CdSe, CdTe and the like.

The glass melt can be obtained by heating the above two kinds of starting materials in a heat-resistant vessel such as refractory crucible or the like. The atmosphere used for obtaining a glass melt is preferably a neutral atmosphere such as nitrogen, argon, helium or the like, or a reducing atmosphere such as ammonia or the like.

The cooling of the glass melt to a temperature $T_1$ which is lower than the sag point of the glass but not lower than the transition temperature of the glass and the subsequent maintenance of the resulting glass at the temeperature $T_1$ can be effected by transferring the glass melt from the heat-resistant vessel onto a metal or carbon heated at a given temperature, or with the glass melt left in the heat-resistant vessel.

The cooling rate used is such that the Cd, S, Se, Te, etc. dissolving in the form of ions in the glass melt are not precipitated as crystals. The maintenance time at the temperature $T_1$ is 30 minutes to 600 hours. A maintenance time shorter than 30 minutes is not preferable in practical application because the precipitation of microcrystallites of semiconductor solid solution is insufficient. A maintenance time longer than 600 hours gives no further change in diameter and density of precipitated microcrystallites of semiconductor solid solution and the resulting glass doped with dispersed microcrystallites shows substantially no further improvement in third-order nonlinear optical properties. Incidentally, the sag point of the glass refers to a temperature at which the viscosity of the glass becomes $1 \times 10^{11}$ poises, and the transition temperature of the glass refers to a temperature at which the viscosity of the glass becomes $1 \times 10^{13}$ poises.

The reason for, in the first step, cooling and maintaining the glass melt to and at the temperature $T_1$ which is lower than the sag point of the glass but not lower than the transition temperature of the glass, is as follows. When the glass melt is cooled to and maintained at a temperature which is not lower than the sag point of the glass, it is difficult to obtain a glass doped with dispersed microcrystallites, having improved third-order nonlinear optical properties. When the glass melt is cooled to and maintained at a temperature which is lower than the transition tmeperature of the glass, there occurs no precipitation of microcrystallites of semiconductor solid solution.

The first embodiment further includes the second step of heating the glass having precipitated microcrystallites of semiconductor solid solution obtained in the first step, to a temperature $T_2$ which is not higher than the flow point of the glass but not lower than the sag point of the glass, and then maintaining the resulting glass at the temperature $T_2$.

The heating and maintenance of the glass in the second step can be effected in the same manner as in the cooling and maintenance of the glass melt in the first step.

The heating rate is preferably larger than 5° C./min. The maintenance time is 5 minutes to 20 hours. A maintenace time shorter than 5 minutes is not preferable in practical application because the precipitation of semiconductor is insufficient. A maintenance time longer than 20 hours gives no further change in amount of precipitated semiconductor and the resulting glass doped with dispersed microcrystallites shows substantially no further improvement in third-order nonlinear optical properties. Incidentally, the flow point of the glass refers to a temperature at which the viscosity of the glass becomes $10^5$ poises, and the sag point of the glass refers, as mentioned above, to a temperature at which the viscosity of the glass becomes $10^{11}$ poises.

The reason for, in the second step, heating and maintaining the glass having precipitated microcrystallites of semiconductor solid solution, to and at the temperature $T_2$ which is not higher than the flow point of the glass but not lower than the sag point of the glass, is as follows. When the glass is heated to and maintained at a temperature which is higher than the flow point of the glass, there occurs deformation of glass during the production, which is undesirable. When the glass is heated to and maintained at a temperature which is lower than the sag point of the glass, it is difficult to obtain a glass doped with dispersed microcrystallites, having improved third-order nonlinear optical properties.

Thus, by heating the glass having precipitated microcrystallites of semiconductor solid solution, obtained in the first step to the temperature $T_2$, there can be obtained a glass doped with dispersed microcrystallites, wherein microcrystallitres of semiconductor solid solution having particle diameters of about 1,000 Å or less have been precipitated and dispersed and which has excellent third-order nonlinear optical properties.

Thus, a glass doped with dispersed microcrystallites wherein microcrystallites of semiconductor solid solution have been precipitated and dispersed, can be produced according to the above-mentioned first embodiment wherein a glass melt comprising a component to become a glass matrix and a component to become microcrystallites of semiconductor solid solution dispersed in the matrix is subjected to particular treatments. This glass can also be produced according to the second embodiment (to be described in detail later) wherein a glass comprising a component to become microcrystalites of semiconductor solid solution is subjected to particular treatments.

The second embodiment comprises:

a first step of heating a glass comprising a component to become microcrystallites of semiconductor solid solution, to a temperature $T_1$ which is lower than the sag point of the glass but not lower than the transition temperature of the glass, and then maintaining the resulting glass at the temperature $T_1$ to precipitate microcrystallites of semiconductor solid solution in the glass, and a second step of heating the glass wherein microcrystallites of semiconductor solid solution have been precipitated, to a temperature $T_2$ which is not higher than the flow point of the glass but not lower than the sag point of the glass, and then maintaining the resulting glass at the temperature $T_2$.

The glass comprising a component to become microcrystallites of semiconductor solid solution, used in the second embodiment can be obtained by, for example, allowing the glass melt mentioned in the first embodiment to cool to room temperature.

The heating of the glass comprising a component to become microcrystallites of semiconductor solid solution can be effected by, for example, heating the glass in a heat-resistant vessel such as refractory crucible or the like. The heating rate is preferably larger than 1° C./min.

In the second embodiment, the maintenance at the temperature $T_1$ of the glass comprising a component to become microcrystallites of semiconductor solid solution as well as the heating and maintenance of the resulting glass to and at the temperature $T_2$ can be effected in the same manner as in the first embodiment.

Thus, by heating the glass comprising a component to become microcrystallites of semiconductor solid solution to the temperature $T_1$ and then maintaining the resulting glass at the temperature $T_1$ to precipitate microcrystallites of semiconductor solid solution, and then heating the glass wherein microcrystallites of semiconductor solid solution have been precipitated, to the temperature $T_2$ and then maintaining the resulting glass at the temperature $T_2$, there can be obtained, as in the first embodiment, a glass doped with dispersed microcrystallites, wherein microcrystallites of semiconductor solid solution having particle diameters of about 1,000 Å or less have been precipitated and dispersed and which has excellent third-order nonlinear optical properties.

The composition of the microcrystallites of semiconductor solid solution precipitated in the first step of the present invention is presumed, when the microcrystallites precipitated is, for example, $CdS_x Se_{1-x}$ ($0<x<1$), to be $CdS_{x1}Se_{1-x1}$ ($0<x1<1$) of high S content and higher melting point (hereunder referred to as "higher-melting $CdS_{x1}Se_{1-x1}$".).

As a result, the concentration of Se ion remaining in the glass matrix becomes higher than the concentration of S ion and, in the second step, it is presumed that $CdS_{x2}Se_{1-x2}$ ($0<x2<1$, $x2<x1$) of high Se content and lower melting point (hereunder referred to as "lower-melting $CdS_{x2}Se_{1-x2}$".) is precipitated on the surfaces of the higher-melting $CdS_{x1}Se_{1-x1}$ microcrystallites precipitated in the first step, to form a surface layer.

Figure 1B:
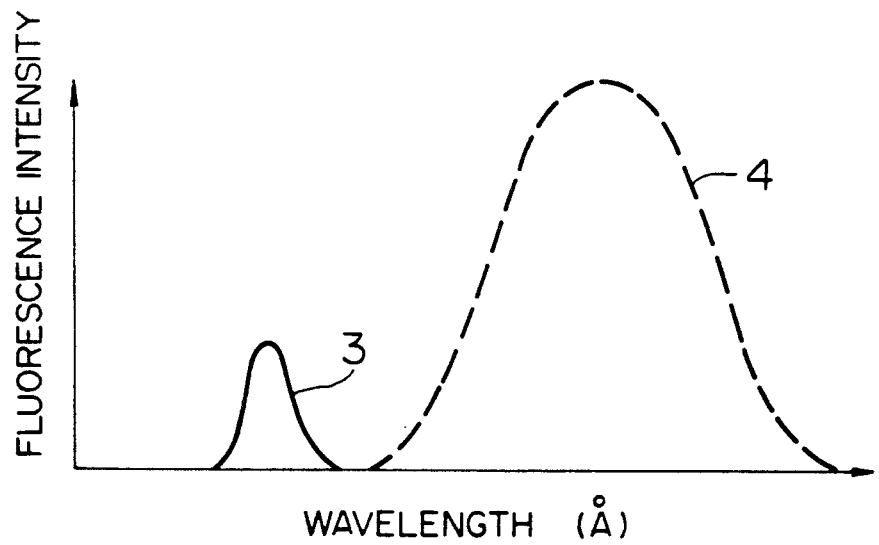

When the microcrystallites of semiconductor solid solution dispersed in the glass matrix has a multilayer structure comprising an inner layer consisting of higher-melting $CdS_{x1}Se_{1-x1}$ microcrystallites of high S content and a surface layer consisting of lower-melting $Cd_{x2}Se_{1-x2}$ of high Se content, precipitated on the surfaces of the higher-melting $CdS_{x1}Se_{1-x1}$ microcrystallites, the emission of the inner layer of the microcrystallites of semiconductor solid solution is an emission from the higher-melting $CdS_{x1}Se_{1-x1}$ microcrystallites of high S content, and its spectral distribution is shifted to a shorter wavelength side from the spectral distribution of the conventional emission shown by the solid line 1 of FIG. 1(a) and becomes one shown by the solid line 3 of FIG. 1(b). Also in the higher-melting microcrystallites of semiconductor solid solution constituting the inner layer, the defect of crystal structure at the surfaces of the microcrystallites of semiconductor solid solution is reduced and, as a result, the appearance of surface trap level is reduced; accordingly, the surface trap level has a reduced effect on the electron interband transition or the electron transition on the exciton in the vicinity of the band edge, both of which transition are a source of third-order optical nonlinear response, and the emission of the band edge of the microcrystallites of semicondutor solid solution has an increased intensity.

Meanwhile, the peak wavelength of the emission from the surface layer consisting of the lower-melting $CdS_{x2}Se_{1-x2}$ of high Se content is at a longer wavelength side than the peak wavelength of the emisssion from the higher-melting $CdS_{x1} Se_{1-x1}$ of high S content. The spectral distribution of the emission from the surface trap level caused by the crystal structure defect, dangling bond, etc. appearing at the interface between the surface layer semiconductor and the glass matrix is shifted to a longer wavelength side from the spectral distribution shown by the broken line 2 of FIG. 1(a), and becomes one shown by the broken line 4 of FIG. 1(b).

Thus in the glass doped with dispersed microcrystallites, produced according to the present invention, the surface trap level has a small effect on the electron interband transition in the inner layer consisting of the microcrystallites of semiconductor solid solution, or on the electron transition on the exciton in the vicinity of the band edge; further, the emission from the microcrystallites of semiconductor solid solution of the inner layer and the emission from the surface trap level caused by the semiconductor of the surface layer can be distinguished clearly.

Accordingly, a glass doped with dispersed microcrystallites, having excellent third-order nonlinear optical properties can be obtained according to the present invention.

The above description applies also when microcrystallites of other semiconductor solid solution such as $CdS_x Se_{1-(x+y)} Te_y$ or the like is precipitated.

The present invention is specifically described below by way of Examples.

EXAMPLE 1

First embodiment

In a refractory crucible were placed (a) 100 parts by weight of a glass consisting mainly of $SiO_2$, $B_2 O_3$, $Na_2 O$, $K_2 O$ and $ZnO$ which was to become a matrix of a glass to be produced and (b) a mixture consisting of 0.5 part by weight of CdS and 1.0 part by weight of CdSe which was to become microcrystallites of semiconductor solid solution dispersed in the matrix: they were heated for 2 hours in a nitrogen atmosphere of 1,300° C. with stirring, to obtain a glass melt; the glass melt was casted on a steel plate heated at 620° C. to cool it to 620° C. The cooled glass was maintained at 620° C. for 27 hours to precipitate microcrystallites of $CdS_x Se_{1-x}$.

First step

This glass had a flow point of 820° C., a sag point of 640° C. and a transition temperature of 540° C.

The glass obtained in the first step was heated to 720° C. in 2 minutes and maintained at 720° C. for 30 minutes.

Second step

The glass obtained in the second step was annealed (cooled slowly) to room temperature to obtain a glass doped with dispersed microcrystallites.

Figure 2:
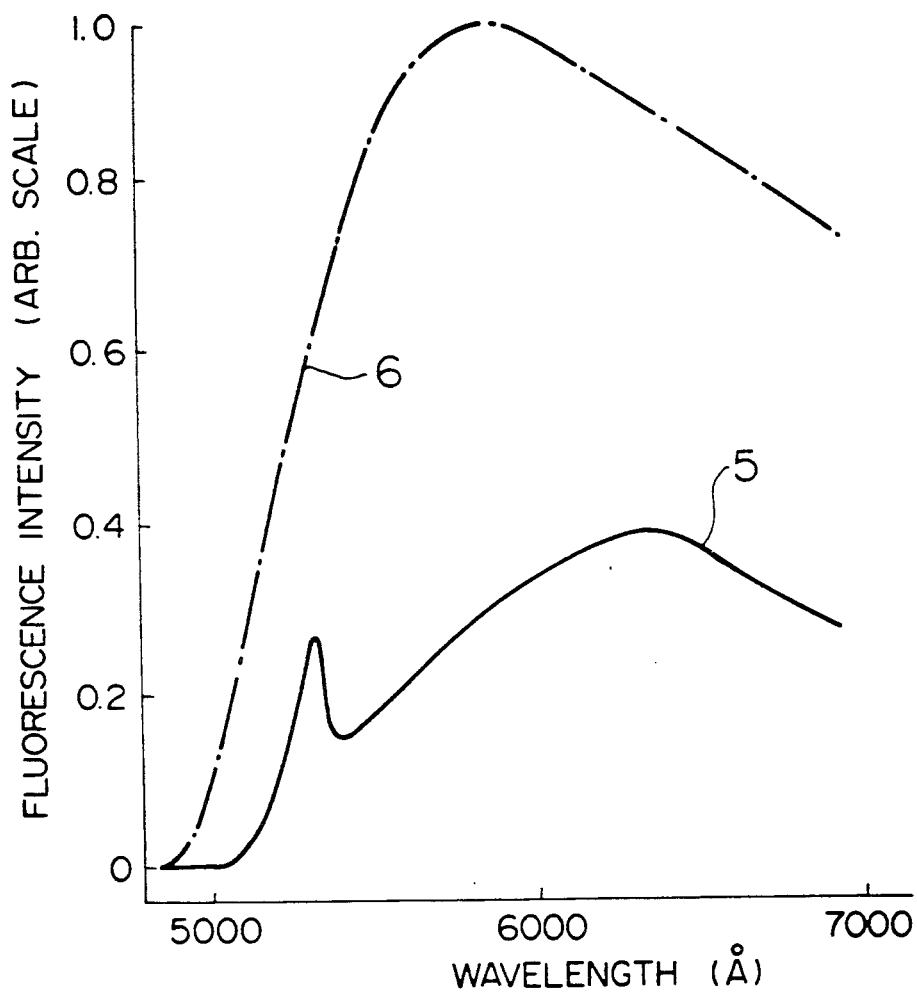
FIG. 2 is a graph showing the fluorescence spectral intensities seen when an argon gas laser beam of 4,880 Å was applied at a temperature of 77K to the glass doped with dispersed microcrystallites obtained in Example 1 and the glass doped with dispersed microcrystallites obtained in Comparative Example 1.

The above glass doped with dispersed microcrystallites was subjected to optical polishing to a thickness of 0.5 mm and measured for fluorescence spectral intensity at a liquid nitrogen temperature of 77 K. when excited by an argon laser beam having a wavelength of 4,880 Å. As a result, there was confirmed a fluorescence (emission) having one peak wavelength at about 5,200 Å (2.38 eV) and another peak wavelength at about 6,600 Å (1.88 eV), as shown by the solid line 5 of FIG. 2.

The fluorescence (emission) at about 5,200 Å is an emission from the band edge of higher-melting $CdS_{x1}Se_{1-x1}$ of high S content. Therefore, it was confirmed that the probability of transition from the band edge of the higher-melting $CdS_{x1}Se_{1-x1}$ was high.

The fluorescence (emission) at about 6,600 Å is an emission from the surface trap level caused by, for example, the crystal structure defect and dangling bond appearing at the interface between lower-melting $CdS_{x2}Se_{1-x2}$ of high Se content and the glass matrix. However, the intensity of this emission is low and its peak wavelength is apart by about 0.5 eV from the peak wavelength of the emission from the band edge of the higher-melting $CdS_{x1}Se_{1-x1}$ microcrystallites of high S content. Therefore, this surface trap level has a small effect on the electron transition between the band edges of the higher-melting $CdS_{x1}Se_{1-x1}$ of high S content or on the electron transition on the exciton in the vicinity of the band edge.

Accordingly, the glass doped with dispersed microcrystallites obtained in this Example had excellent third-order nonlinear optical properties.

EXAMPLE 2

Second embodiment

The glass obtained in the same manner as in Example 1 was casted on a steel plate maintained at room temperature to cool it to room temperature to obtain a glass comprising a component to become microcrystallites of semiconductor solid solution. This glass had a flow point of 820° C., a sag point of 640° C. and a glass transition temperature of 540° C.

The glass was heated to 600° C. in 5 minutes in air and maintained at 600° C. for 54 hours to precipitate microcrystallites of $CdS_x Se_{1-x}$.

First step

The glass obtained in the first step was heated to 720° C. in 2 minutes and maintained at 720° C. for 30 minutes.

Second step

The glass after the second step was annealed to room temperature to obtain a glass doped with dispersed microcrystallites.

The glass doped with dispersed microcrystallites was measured for fluorescence spectral intensity in the same manner as in Example 1. As a result, there was confirmed, as in Example 1, a fluorescence (emission) having one peak wavelength at 5,200 Å (2.38 eV) and another peak wavelength at about 6,600 Å (1.88 eV). Accordingly, this glass also had excellent third-order nonlinear optical properties.

EXAMPLE 3

Second embodiment

A glass melt was obtained in the same manner as in Example 1 except that as the starting material for microcrystallites of semiconductor solid solution to be precipitated, there were used 0.3 part by weight of CdS, 1.0 part by weight of CdSe and 0.2 part by weight of CdTe. The glass melt was cooled to room temperature in the same manner as in Example 2 to obtain a glass comprising a component to become microcrystallites of semiconductor solid solution. This glass had a flow point of 800° C., a sag point of 630° C. and a glass transition temperature of 540° C.

The glass was heated to 600° C. in 5 minutes in air and maintained at 600° C. for 54 hours to precipitate microcrystallites of $CdS_x Se_{1-(x+y)} Te_y$.

First step

The glass obtained in the first step was heated to 700° C. in 2 minutes and maintained at 700° C. for 30 minutes.

Second step

The glass after the second step was annealed to room temperature to obtain a glass doped with dispersed microcrystallites.

The glass doped with microcrystallites was measured for fluorescence spectral intensity in the same manner as in Example 1. As a result, there was confirmed a fluorescence (emission) having one peak wavelength at about 6,200 Å (2.00 eV) and another peak wavelength at about 7,700 Å (1.67 eV).

The fluorescence (emission) at about 6,200 Å is an emission from the band edge of microcrystallites of higher-melting $CdS_{x1}Se_{1-(x1+y1)}Te_{y1}$ ($0<x1<1$, $0<y1<1$, $0<x1+y1<1$, the same applies hereinafter) of high S content. Therefore, it was confirmed that the probability of transition from the band edge of said higher-melting $CdS_{x1}Se_{1-(x1+y1)}Te_{y1}$ microcrystallites was high.

The fluorescence (emission) at about 7,700 Å is an emission from the surface trap level caused by, for example, the crystal structure defect and dangling bond appearing at the interface between lower-melting $CdS_{x2}Se_{1-(x2+y2)}Te_{y2}$ ($0<x2<1$, $0<y2<1$, $0<x2+y2<1$, $x2<x1$, $y2<y1$) of high Se content and high Te content and the glass matrix. However, the intensity of this emission is low and its peak wavelength is apart by about 0.3 eV from the peak wavelength of the emission from the band edge of the higher-melting $CdS_{x1}$ $Se_{1-(x1-y1)}Te_{y1}$ microcrystallites of high S content. Therefore, this surface trap level has a small effect on the electron transition between the band edges of the higher-melting $CdS_{x1}Se_{1-(x1-y1)}Te_{y1}$ of high S content or on the electron transition on the exciton in the vicinity of the band edge.

Accordingly, the glass doped with dispersed microcrystallites obtained in this Example also had excellent third-order nonlinear optical properties.

COMPARATIVE EXAMPLE 1

A glass comprising a component to become microcrystallites of semiconductor solid solution was obtained in the same manner as in Example 2. The glass was heated to 600° C. in 5 minutes in air and then maintained at 600° C. for 54 hours to precipitate microcrystallites of $CdS_x Se_{1-x}$.

The resulting glass was annealed to room temperature unlike in the case of Example 2, to obtain a glass doped with dispersed microcrystallites.

This glass doped with dispersed microcrystallites was measured for fluorescence spectral intensity in the same manner as in Example 2. As a result, there was confirmed a broad and very intense fluorescence (emission) having a peak wavelength at about 5,800 Å (2.18 eV), as shown in the broken line 6 of FIG. 2.

This fluorescence (emission) is an emission from the surface trap level caused by, for example, the crystal structure defect and dangling bond appearing at the interface between the $CdS_x Se_{1-x}$ microcrystallites and the glass matrix, and there was observed no emission from the band edge of $CdS_x Se_{1-x}$ microcrystallites.

This indicates that the surface trap level gives a large effect on the electron transition between the band edges of $CdS_x Se_{1-x}$ microcrystallites or on the electron transition on the exciton in the vicinity of the band edge. Accordingly, the glass doped with dispersed microcrystallites obtained in this Comparative Example had poor third-order nonlinear optical properties.

COMPARATIVE EXAMPLE 2

A glass comprising a component to become microcrystallites of semiconductor solid solution was obtained in the same manner as in Example 3. The glass was heated to 600° C. in 5 minutes in air and then maintained at 600° C. for 54 hours to precipitate microcrystallites of $CdS_x Se_{1-(x+y)} Te_y$.

The resulting glass was annealed to room temperature unlike in the case of Example 3, to obtain a glass doped with dispersed microcrystallites.

This glass doped with dispersed microcrystallites was measured for fluorescence spectral intensity in the same manner as in Example 3. As a result, there was confirmed a broad and very intense fluorescence (emission) having a peak wavelength at about 6,900 Å (1.80 eV).

This fluorescence (emission) is an emission from the surface trap level caused by, for example, the crystal structure defect and dangling bond appearing at the interface between the $CdS_x Se_{1-(x+y)} Te_y$ microcrystallites and the glass matrix, and there was observed no emission from the band edge of $CdS_x Se_{1-(x+y)} Te_y$ microcrystallites.

This indicates that the surface trap level gives a large effect on the electron transition between the band edges of $CdS_xSe_{1-(x+y)}Te_y$ microcrystallites or on the electron transition on the exciton in the vicinity of the band edge. Accordingly, the glass doped with dispersed microcrystallites obtained in this Comparative Example had poor third-order nonlinear optical properties.

As described above, in the glass doped with dispersed microcrystallites obtained in the present invention, the effect of the surface trap level on the emission from the band edge which is a source of third-order optical nonlinear response is reduced, and the emission from the band edge and the emission from the surface trap level can be distinguished clearly.

Accordingly, a glass doped with dispersed microcrystallites having excellent third-order nonlinear optical properties can be obtained by carrying out the present invention.

What is claimed is:

1. A process for producing a glass doped with dispersed microcrystallites of $CdSxSe_{1-x}(0<x<1)$ or $CdSxSe_{1-(x-y)}Te_y(0<x<1, 0<y<1, 0<x+y<1)$, which comprises:

a first step of cooling a glass melt comprising a component to become a glass matrix and a component to become microcrystallites of semiconductor solid solution dispersed in the matrix, to a temperature $T_1$ which is lower than the sag point of the glass but not lower than the transition temperature of the glass, and then maintaining the resulting glass at the temperature $T_1$ to precipitate microcrystallites of semiconductor solid solution in the glass, and a second step of heating the glass wherein microcrystallites of semiconductor solid solution have been precipitated, to a temperature $T_2$ which is not higher than the flow point of the glass but not lower than the sag point of the glass, and then maintaining the resulting glass at the temperature $T_2$.

2. A process according to claim 1, wherein the atmosphere used for obtaining the glass melt is a neutral atmosphere or a reducing atmosphere.

3. A process according to claim 1, wherein the cooling rate used in cooling the glass melt to the temperature $T_1$ is such as the starting material for microcrystallites of semiconductor solid solution, dissolved in the form of ions in the glass melt is not precipitated as crystals.

4. A process according to claim 1, wherein the starting material for the glass matrix is at least one compound selected from the group consisting of oxides, carbonates, acetates and hydroxides, or a glass obtained from at least one compound selected from said group.

5. A process according to claim 1, wherein the starting material for the microcrystallites of semiconductor solid solution is at least one metal, nonmetal or compound selected from the group consisting of Cd, S, Se, Te, CdS, CdSe and CdTe.

6. A process according to claim 1, wherein the maintenance time at $T_1$ is 30 minutes to 600 hours.

7. A process according to claim 1, wherein the heating rate from $T_1$ to $T_2$ is larger than 5° C./min.

8. A process according to claim 1, wherein the maintenance time at $T_2$ is 5 minutes to 20 hours.

9. A process for producing a glass doped with dispersed microcrystallites of $CdSxSe_{1-x}(0<x<1)$ or $CdSxSe_{1-(x+y)}Te_y(0<x<1, 0<y<1, 0<x+y<1)$, which comprises:

a first step of heating a glass comprising a component to become microcrystallites of semiconductor solid solution, to a temperature $T_1$ which is lower than the sag point of the glass but not lower than the transition temperature of the glass, and then maintaining the resulting glass at the temperature $T_1$ to precipitate microcrystallites of semiconductor solid solution in the glass, and a second step of heating the glass wherein microcrystallites of semiconductor solid solution have been precipitated, to a temperature $T_2$ which is not higher than the flow point of the glass but not lower than the sag point of the glass, and then maintaining the resulting glass at the temperature $T_2$.

10. A process according to claim 9, wherein the heating rate used in heating the glass comprising a component to become microcrystallites of semiconductor solid solution to the temperature $T_1$ is larger than 1° C./min.

11. A process according to claim 9, wherein the starting material for the glass matrix is at least one compound selected from the group consisting of oxides, carbonates, acetates and hydroxides, or a glass obtained from at least one compound selected from said group.

12. A process according to claim 9, wherein the starting material for the microcrystallites of semiconductor solid solution is at least one metal, nonmetal or compound selected from the group consisting of Cd, S, Se, Te, CdS, CdSe and CdTe.

13. A process according to claim 9, wherein the maintenance time at $T_1$ is 30 minutes to 600 hours.

14. A process according to claim 9, wherein the heating rate from $T_1$ to $T_2$ is larger than 5° C./min.

15. A process according to claim 9 wherein the maintenance time at $T_2$ is 5 minutes to 20 hours.

* * * * *